US009580674B2

(12) United States Patent
Scheller et al.

(10) Patent No.: US 9,580,674 B2
(45) Date of Patent: Feb. 28, 2017

(54) METHOD FOR ADDING HOPS IN BEER MANUFACTURE

(75) Inventors: Ludwig Scheller, Ettringen (DE); Rudolf Michel, Bamberg (DE); Patrick Bahns, Kitzingen (DE)

(73) Assignee: GEA BREWERY SYSTEMS GMBH, Kitzingen (DE)

( * ) Notice: Subject to any disclaimer, the term of this patent is extended or adjusted under 35 U.S.C. 154(b) by 343 days.

(21) Appl. No.: 14/112,149

(22) PCT Filed: Mar. 8, 2012

(86) PCT No.: PCT/DE2012/000226
§ 371 (c)(1),
(2), (4) Date: Nov. 27, 2013

(87) PCT Pub. No.: WO2012/142988
PCT Pub. Date: Oct. 26, 2012

(65) Prior Publication Data
US 2014/0072691 A1    Mar. 13, 2014

(30) Foreign Application Priority Data

Apr. 21, 2011    (DE) .................. 10 2011 018 646

(51) Int. Cl.
*C12C 3/00*    (2006.01)
*B01F 3/08*    (2006.01)
(Continued)

(52) U.S. Cl.
CPC .............. *C12C 3/00* (2013.01); *B01F 3/0807* (2013.01); *B01F 5/0661* (2013.01);
(Continued)

(58) Field of Classification Search
CPC ............ B01F 2003/0849; B01F 3/0807; B01F 5/0661; C12C 3/00; C12C 7/22; C12C 13/00

USPC ............................................. 426/600; 516/9
See application file for complete search history.

(56) References Cited

U.S. PATENT DOCUMENTS 4,996,004 A    2/1991    Bucheler et al.
2005/0013885 A1*    1/2005    Chiasson ............... A01N 65/00
424/764
(Continued)

FOREIGN PATENT DOCUMENTS

| CN | 101484225 A | 7/2009 |
|---|---|---|
| DE | 967 433 C | 11/1957 |

(Continued)

OTHER PUBLICATIONS

State Intellectual Property Office of People's Republic of China, First Office Action and Search Report, Application No. 201280018960.X, Jan. 26, 2015, 13 pages.

(Continued)

*Primary Examiner* — Vera Stulii
(74) *Attorney, Agent, or Firm* — Quarles & Brady LLP

(57) ABSTRACT

The invention relates to a method for adding hops in beer manufacture, having the following process steps; a) separation of a sub-quantity (07a) of water and/or wort (07) and/or beer as an aqueous fluid, b) addition of hop extract (10) in liquid or pasty form to the separated aqueous fluid (07a), c) production of a macroemulsion (13) of the hop extract by emulsifying the hop extract (10) in the aqueous fluid (07a), d) increasing the pressure in the macroemulsion (13) of the hop extract to a feed pressure of in particular higher than 100 bar, e) production of a microemulsion (17) of the hop extract by feeding the pressurized macroemulsion (13) through a gap or a valve (16) or by feeding the pressurized macro-
(Continued)

emulsion against a baffle plate, f) at least partial return of the microemulsion (17) of the hop extract to the beer manufacturing process.

10 Claims, 4 Drawing Sheets

(51) Int. Cl.
*B01F 5/06* (2006.01)
*B01F 13/10* (2006.01)
*C12C 7/22* (2006.01)
*C12C 13/00* (2006.01)

(52) U.S. Cl.
CPC .............. *B01F 13/103* (2013.01); *C12C 7/22* (2013.01); *C12C 13/00* (2013.01); *B01F 2003/0849* (2013.01)

(56) References Cited

U.S. PATENT DOCUMENTS

2009/0258043 A1 10/2009 Eskuchen et al.
2009/0321353 A1 12/2009 Wihlborg

FOREIGN PATENT DOCUMENTS

| | | |
|---|---|---|
| DE | 19 34 709 A1 | 2/1971 |
| DE | 158 558 A1 | 1/1983 |
| DE | 601 17 802 T2 | 10/2006 |
| DE | 10 2007 062948 | 6/2009 |
| EP | 0 101 077 A2 | 2/1984 |
| EP | 1 299 521 B1 | 4/2003 |
| EP | 1 431 385 A1 | 6/2004 |
| EP | 1 849 452 A1 | 10/2007 |
| EP | 2 417 858 A1 | 2/2012 |
| GB | 1 071 867 A | 6/1967 |
| GB | 1 501 098 A | 2/1978 |
| WO | 97/03576 A1 | 2/1997 |

OTHER PUBLICATIONS

The English translation of the International Preliminary Report on Patentability as mailed on Oct. 31, 2013 for International Application No. PCT/DE2012/000226.
The International Search Report as mailed on Jun. 26, 2012 for International Application No. PCT/DE2012/000226.
An Office Action as mailed on Jan. 24, 2012 from the German Patent Office for Priority German Application No. 10 2011 018 646.8.

* cited by examiner

/13

| Volume Statistics (Arithmetic) | | | | |
|---|---|---|---|---|
| Calculations from 0.040 µm to 2000 µm | | | | |
| Volume: | 100% | | | |
| Mean: | 12.25 µm | S.D.: | 7.710 µm | |
| Median: | 12.42 µm | Variance: | 59.44 µm$^2$ | |
| Mean/Median ratio: | 0.986 | C.V.: | 62.9% | |
| Mode: | 18.00 µm | Skewness: | 0.117 Right skewed | |
| | | Kurtosis: | -0.876 Platykurtic | |
| $d_{10}$: 1.155 µm | | $d_{50}$: 12.42 µm | | $d_{90}$: 22.48 µm |
| <10% | <25% | <50% | <75% | <90% |
| 1.155 µm | 5.864 µm | 12.42 µm | 18.14 µm | 22.48 µm |

| Volume Statistics (Arithmetic) | | | | |
|---|---|---|---|---|
| Calculations from 0.040 µm to 2000 µm | | | | |
| Volume: | 100% | | | |
| Mean: | 1.949 µm | S.D.: | 1.099 µm | |
| Median: | 1.623 µm | Variance: | 1.207 µm$^2$ | |
| Mean/Median ratio: | 1.201 | C.V.: | 56.4% | |
| Mode: | 1.322 µm | Skewness: | 0.965 Right skewed | |
| | | Kurtosis: | 0.154 Leptokurtic | |
| $d_{10}$: 0.809 µm | | $d_{50}$: 1.623 µm | | $d_{90}$: 3.682 µm |
| <10% | <25% | <50% | <75% | <90% |
| 0.809 µm | 1.098 µm | 1.623 µm | 2.592 µm | 3.682 µm |

METHOD FOR ADDING HOPS IN BEER MANUFACTURE

CROSS-REFERENCE TO RELATED APPLICATIONS

This application represents the national stage entry of PCT International Application No. PCT/DE2012/000226 on Mar. 8, 2012 and claims the benefit of German Patent Application No. 10 2011 018 646.8 filed Apr. 21, 2011. The contents of both of these applications are hereby incorporated by reference as if set forth in their entirety herein.

The invention relates to a method for adding hops in beer manufacture according to the teaching of the main method claim. Further, the invention relates to a device which can be used to implement the method according to the invention. Finally, the invention relates to a process product which can be produced by the method according to the invention.

One of the basic components in beer manufacture is the hops. In brewing, the inflorescences of the female plants are used. They contain, among other things, bitter resins and essential oils as valuable components which provide bitter and aromatic components to the beer. Since hop products are very expensive, an effective use of the components comprised in the hops is of high importance. Since the valuable components (e.g. alpha acids) are not soluble in water, they first have to be converted into a water-soluble form. This process is called isomerization. It can be achieved by, among other methods, a temperature treatment, in which the alpha acids are converted into the form of iso-alpha acids. The exact processes and methods of isomerization are commonly known and can be taken from the pertinent technical literature.

For the addition of hops in brewing, there are essentially three different hop products at disposal, namely natural hops, hop pellets and hop extract. For the production of hop extracts, an extraction of the natural hops is performed so as to retrieve individual components from the plant with the help of suitable solvents. The best manageability of the hops in brewing is given if liquid or pasty hop extract (in the following only referred to as hop extract) is used because these hop extracts can easily be mechanically fed (e.g. by pumps) and can be dosed relatively very exactly. When using hop extracts, the viscosity of the hop extract is first lowered by heating, for example to 45 to 50° C., and the extract, thus turned capable of flowing and being pumped, is added to the brewing water or the wort. One problem in processing the hop extracts lies especially in the fact that the hop extract, which substantially consists of hydrophobic components, can barely be mixed with the aqueous surroundings of the brewing water or wort. But an effective isomerization of the hop components can be expected only in the case of a sufficiently homogenous mixing of the hop extract with the aqueous surroundings of the brewing water or wort. In order to quantitatively transfer the valuable components of the hop extract into the aqueous solution, the time for which the hop extract stays in the aqueous solution during the cooking of the wort can be prolonged, though this is not possible without limits in view of wort cooking times being shortened in most cases nowadays. It is also possible to increase the cooking temperature in order to improve the isomerization of the alpha acids of the hop extract. However, this, too, sometimes causes undesired effects in the wort.

From DE-PS 967 433, a method for an ultrasound treatment of natural hops in the presence of water or aqueous solutions is known for improving the utilization of the high-grade bitter substances from the natural hops. It is disadvantageous in the there-described method that when using natural hops, a high amount of spent hops accumulates, the removal of which from the used hopping device is elaborate, so that a time-consuming and costly cleaning of the used hop adding device is unavoidable.

From DD 1585 58 B1, a single-stage process for fluidizing the bitter substances by emulsifying hop extract is known. An inert gas is applied to the macroemulsion during emulsification in order to prevent an oxidation of the bitter substances.

Based on this state of the art, it is therefore the object of the present invention to propose a new method for adding hops in beer manufacture, by means of which the ingredients comprised in the hop extract can be exploited more effectively. Further, it is the object of the present invention to propose a microemulsion of a hop extract in an aqueous solution, which can in particular be produced by the method according to the invention and can be used for beer manufacture. Finally, it is the object of the present invention to propose a device for producing said aqueous microemulsion of the hop extract in an aqueous solution.

These objects are attained by the teaching of the independent main claims.

Advantageous embodiments of the invention are the subject matter of the dependent claims.

First, the starting point of the method according to the invention is the separation of a sub-quantity of the brewing water and/or of the wort and/or of the beer as the aqueous fluid to which the desired amount of hop extract is to be added. In other words this means that the hop extract is not introduced into the normal volume flow of the brewing water or the wort or the beer during the brewing process. Instead, a sub-quantity of the aqueous fluid is taken out of the brewing process and is then processed with the method according to the invention independently of the remaining volume flow in the brewhouse so as to fluidize the hop extract in the separated sub-quantity as finely as possible.

After the separation of the desired sub-quantity of the aqueous fluid, the necessary amount of hop extract is added to the sub-quantity so that a mixture of the hop extract and the aqueous fluid is produced. However, the dispersion of the hop extract in this aqueous solution at this point is still relatively coarse since the predominantly hydrophobic components of the hop extract are barely soluble in the aqueous fluid.

In order to fluidize the hop extract more finely in the aqueous fluid, according to the invention an at least two-staged emulsifying process is proposed. In the first stage of this process, a macroemulsion of the hop extract is initially produced by emulsifying the hop extract in the aqueous fluid. This macroemulsion is a relatively fine dispersion of hop extract droplets (dispersed phase) in the aqueous basic fluid (continuous phase), i.e. an O/W emulsion or oil-in-water emulsion. However, tests have shown that this macroemulsion is not yet suitable to actually almost fully exploit the ingredients of the hop extract because the available contact surface (specific surface) between the aqueous fluid and the hop extract droplets is still relatively small. Therefore, according to the invention, for further improving the utilization of the hop extract, it is provided that a feed pressure is applied to the macroemulsion, which pressure is preferably higher than 100 bar. The thus pressurized macroemulsion is then fed through a gap, a valve or against a baffle plate while experiencing a high-pressure-low-pressure relaxation cycle. This relaxation cycle causes the hop extract droplets in the macroemulsion to burst and in this manner a microemulsion of the hop extract in the aqueous fluid is created. The particle size of the hop extract droplets is decreased at least by the factor 2 due to the high-pressure-low-pressure relaxation and the available contact surface between the hop extract droplets and the surrounding aqueous fluid is correspondingly increased disproportionately. The two-staged size reduction of the hop extract droplets first into the macroemulsion and then into the microemulsion herein is absolutely necessary because the available emulsification methods are suitable either only for converting the simple mixture of hop extract and aqueous fluid into the macroemulsion or only from the macroemulsion into the microemulsion. A direct conversion of the mixture of hop extract and aqueous fluid into the microemulsion is not possible.

After producing the microemulsion of the hop extract, the microemulsion is then reintroduced into the main volume flow of the brewing process so that the ingredients comprised in the hop extract can take their desired process effects there. Due to the present large specific surface of the hop extract droplets, a complete extraction into the aqueous phase and a quick isomerization are ensured.

For differentiating between the simple mixture of hop extract and aqueous fluid on the one hand and a macroemulsion of the hop extract in an aqueous solution on the other hand different definitions are conceivable, in particular because the differentiation is essentially a statistical consideration of the particle size distribution of the hop extract droplets in the aqueous solution. According to a preferred variation, a macroemulsion in the sense of the invention is to be assumed if at least 75% of the hop extract droplets are smaller than or equal to 20 μm. According to a further definition a macroemulsion is present if 90% of the hop extract droplets have a particle size of less than or equal to 23 μm. According to a third definition a macroemulsion is present if 50% of the hop extract droplets have a particle size of less than or equal to 13 μm. Instead of size distribution, the macroemulsion can also be defined by the arithmetic mean of the particle size of the hop extract droplets. Preferably, the hop extract droplets in the macroemulsion in the arithmetic mean have a particle size in the range of 6 μm to 24 μm.

The definition of the microemulsion, too, is a statistical consideration of the size distribution of the hop extract droplets in the emulsion liquid. According to a preferred variation, a microemulsion in the sense of the invention is present if 75% of the hop extract droplets have a particle size of less than 5 μm, in particular of less than 3 μm. As an alternative, again, the percentages of the particle sizes of 90%, respectively 50%, can be used as a basis. Accordingly, it is a microemulsion in the sense of the invention if 90% of the hop extract droplets have a particle size of less than or equal to 9 μm, in particular less than or equal to 4 μm. Also, it is a microemulsion in the sense of the invention if 50% of the hop extract droplets have a particle size of less than or equal to 2.5 μm, in particular less than or equal to 2 μm.

The microemulsion, too, can be defined by the arithmetic mean of the particle size. Preferably, the hop extract droplets in the microemulsion in the arithmetic mean have a particle size in the range of 0.5 μm to 5 μm.

The alpha acids or humulones comprised in the hop extract are the most important compounds for the bittering of the beer. However, the alpha acids in their basic state are not soluble and have to be converted by isomerization into water-soluble iso-alpha acids in order to ensure the desired bittering of the beer. To ensure the necessary conversion of the alpha acids comprised in the hop extract into the desired iso-alpha acids, the macroemulsion produced in the method according to the invention and/or the microemulsion of the hop extract produced in the method according to the invention can be subjected to a temperature treatment for isomerization. Since this temperature treatment only concerns a very small portion of the aqueous fluid, which later will form the wort volume, there is the option of tailoring the temperature treatment entirely to the requirements of the necessary alpha acid isomerization. According to a preferred process variation, it is therefore provided that the macroemulsion and/or the microemulsion are exposed to an isomerization temperature treatment. A temperature treatment of the wort in the main flow of the beer production for the alpha acid isomerization can thus be omitted. In this way, the cooking time of the wort can be reduced drastically.

It is particularly advantageous if prior to the addition of the hop extract the separated aqueous fluid is heated under pressure to a temperature above 100° C., in particular to a temperature between 120° C. and 140° C. In this way, a very good mixture of the hop extract droplets in the aqueous fluid can be achieved when the hop extract is added to the aqueous fluid because the increased temperatures lead to a decrease in the viscosity of the hop extract. Also, due to the increased temperatures, it is achieved that the isomerization of the alpha acids in the hop extract is started. It is generally optional whether a certain degree of vaporization takes place during the temperature treatment.

Alternatively or additionally, it is conceivable that the temperature treatment for isomerization by heating the hop extract droplets takes place during the production of the macroemulsion. To that effect the macroemulsion can for example be heated to an isomerization temperature during emulsification. Additionally, due to the increased temperature, the dispersion of the hop extract droplets in the macroemulsion is improved.

The isomerization temperature applied in the course of the process for the production of the microemulsion should substantially correspond to the temperature at which the wort cooking in the main process of the beer manufacture is performed. Thereby, it is made sure that the temperature stress on the wort and the thus adjusted wort properties are substantially equal in both sub-processes and that possible negative influences on the eventual taste of the beer are precluded by the method according to the invention. This means that when implementing the high temperature wort cooking, temperatures of, for example, up to 120-140° C. are present in this process.

The pressure at which the macroemulsion of the hop extract is fed through the provided valve or the provided gap or against the used baffle plate is generally optional as long as the desired high-pressure-low-pressure relaxation process takes place and the hop extract droplets burst accordingly. Customarily, the feed pressure has to reach a high pressure level and, to that effect, has to lie at a maximum pressure level of higher than or equal to 200 bar. In particular, the adjustment of a maximum pressure level of higher than or equal to 300 bar is particularly well suited to disperse the hop extract droplets extremely finely in the aqueous solution. In tests, the best results were achieved with a pressure of 400 bar. At a pressure higher than 500 bar, however, high energy costs are to be expected.

A further change of the hop extract droplet dispersion towards smaller particles can also be achieved if the microemulsion, after undergoing the high-pressure-low-pressure relaxation process for a first time, undergoes said process a second time and while doing so is again pressurized and fed through a gap or a valve or against a baffle plate. Due to the at least one repetition of the high-pressure-low-pressure relaxation, the particle size of the hop extract droplets can be further reduced statistically speaking.

It is generally optional at which step of the main process for beer manufacture the microemulsion of the hop extract is reintroduced. It is also optional in which amounts the microemulsion is added. A division into several parts is conceivable, for example, which parts are added to the process in different steps or at different points in time. According to a first variation, at least a part of the microemulsion is added prior to or during the cooking of the wort.

Alternatively or additionally to adding the microemulsion during the cooking of the wort, the microemulsion may also follow already after the lautering and prior to the cooking of the wort. To that effect, a part or all of the microemulsion can be introduced into a primary feed tank, which is interposed between the lauter tun and the downstream wort cooking device.

According to a third variation, a part or all of the microemulsion of the hop extract can be added to the wort prior to or during the trub separation as well, because the trub separation processes can be positively influenced by the ingredients of the hop extract.

According to a fourth variation, the microemulsion of the hop extract can also be added between the trub separation and the cooling of the wort. Thus, the loss of hops through the trub is reduced. If a system for post-vaporization (stripping system) is present between the trub separation and the wort cooling, the microemulsion could also be added after post-vaporization so as to reduce aroma loss due to the vaporization. However, it can be sensible to add at least a part of the microemulsion prior to or in the process of cooking the wort so as to support the formation of hot trub.

Apart from the method according to the invention, an aqueous microemulsion of a hop extract for the use in beer manufacture is also claimed, which microemulsion can in particular be produced by the method according to the invention. According to the invention, at least 75% of the hop extract droplets in the microemulsion have a particle size of less than 5 µm.

For the implementation of the method according to the invention, a device is proposed which has two particle size reduction stages. In the first particle size reduction stage, the mixture of water and/or wort and/or beer for one part and hop extract for the other part is emulsified to a macroemulsion. In the second particle size reduction stage this macroemulsion is then pressurized by means of a feed pump to high pressure, in particular to a pressure of higher than 100 bar, and is then fed through a gap or a valve or against a baffle plate. Due to the high-pressure-low-pressure relaxation process taking place therein, the hop extract droplets of the macroemulsion are split up further and in doing so form a microemulsion of the hop extract.

Which type of apparatus is used in the first particle size reduction stage for emulsifying the mixture of aqueous fluid and hop extract is generally optional. A shear stirrer is particularly suitable. Alternatively, ultrasound applications are also conceivable in the first particle size reduction stage.

Due to the homogenous dispersion of the hop extract droplets in the microemulsion produced according to the invention, a very stable product is created which can be stored without any problem even at low temperatures, in particular at room temperature. Thus, it is particularly advantageous if downstream of the device according to the invention for producing the microemulsion a storage container is arranged, in which the microemulsion can be stored temporarily. In this manner, the microemulsion can be produced independently of the main process for beer manufacture and can then be respectively fed from the storage container to the necessary process places. A further isomerization of the microemulsion in the storage container is also conceivable due to the fact that, in addition to a good insulation, the container is provided with a device for maintaining the temperature constant at an isomerization temperature (e.g. a tank heater for compensating radiation losses). In order to maintain the temperature constant in the entire container, a stirrer or a circulating pump device is conceivable in the storage container.

The microemulsion produced according to the invention is capable of being pumped without any problem even at room temperature, which presents a big advantage over the normally used hop extract. Also, no expensive positive displacement pumps are required for pumping the microemulsion, but merely simple centrifugal pumps, for example. On the basis of this good pumpability it is further possible without any problem to connect the device for producing the microemulsion or the downstream storage container for temporary storage of the microemulsion via respective feed ducts to downstream process containers and/or to the pipe ducts arranged in between in the brewhouse. In this way, the microemulsion produced according to the invention can be fed without any problem even over long distances to any place in the brewhouse or in the fermenting cellar and can be used there. It is particularly advantageous if the feed ducts for the microemulsion run towards the lautering device (lauter tun) and/or to a primary feed tank between the lauter tun and the wort kettle and/or to a wort cooking device and/or to a trub separating device (whirlpool) and/or to a device for post-vaporization (stripping) and/or to a wort cooler.

Different aspects of the invention are schematically illustrated in the drawings and diagrams in the figures and are explained in examples in the following.

FIG. 3 shows the measured data for characterizing the particle size distribution in the macroemulsion illustrated according to FIG. 2;

FIG. 4 shows the measured data of the particle size distribution in the macroemulsion illustrated according to FIG. 2;

Figure 1:
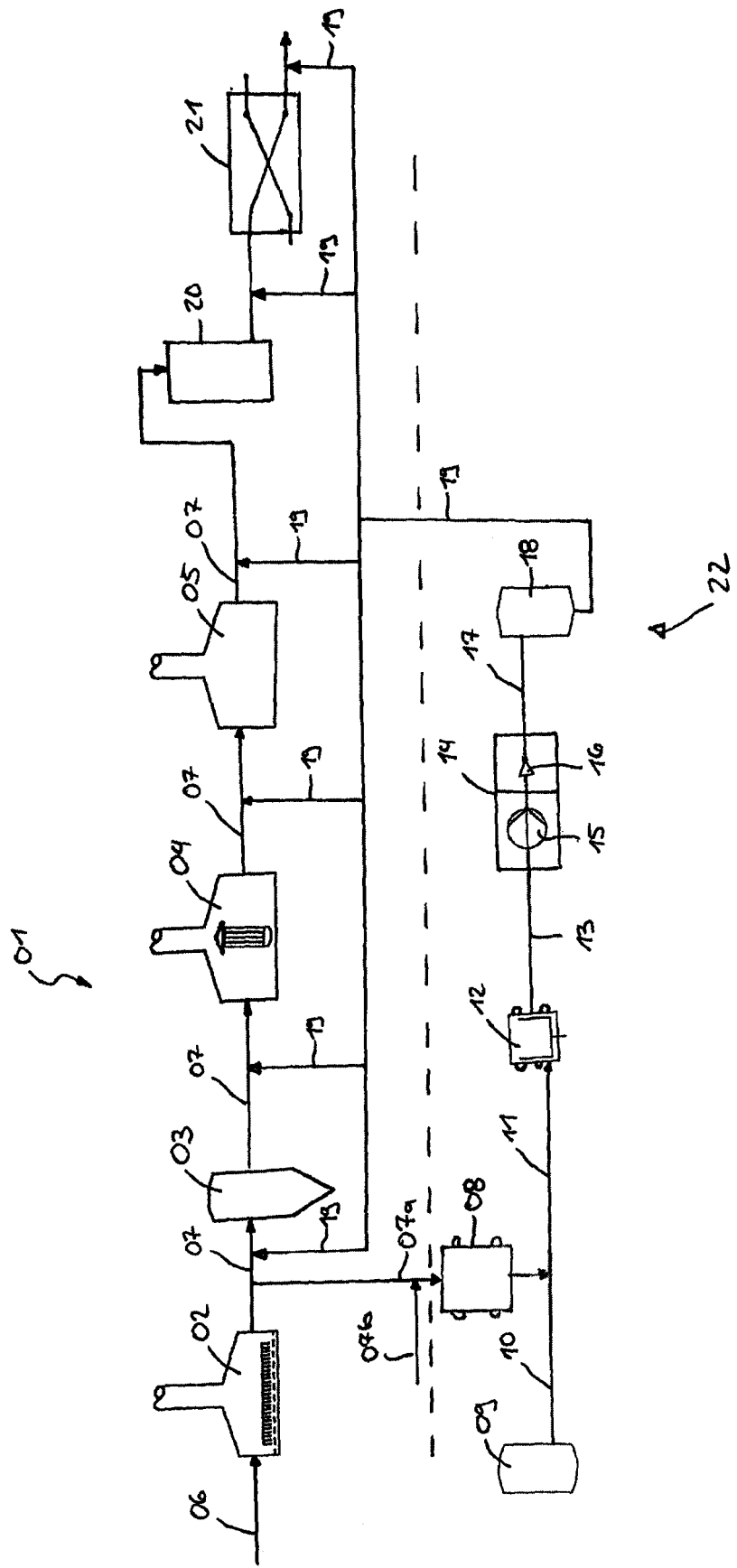
FIG. 1 shows a schematic illustration of the integration of a device according to the invention for producing a microemulsion of the hop extract in a brewhouse system.

FIG. 1 shows only schematically the structure of a brewhouse 01 comprising a lauter tun 02, a primary feed tank 03, a wort kettle 04 and a whirlpool 05. After the mashing process, the mash 06 is lautered in the lauter tun 02 and, thus, wort 07 is produced. The wort 07 is then fed through the different tanks 03, 04 and 05 of the brewhouse, one after the other, so as to manufacture beer in the known manner. This process is commonly known. A device 22 for producing an aqueous microemulsion 17 of a hop extract is assigned to the brewhouse 01.

A sub-quantity 07a of the wort 07 produced in the lauter tun 02 is separated and pumped into a heatable first particle size reduction stage 12 of the device 22. The first particle size reduction stage 12 can be a shear stirrer, for example. In the alternative, any other given device 08 for heating the fluid 07 can be integrated into the duct. In that case, the first particle size reduction stage 12 does not have to be heatable. Furthermore, hop extract 10 is pumped from a hop storage tank 09 into the first particle size reduction stage 12 and there is mixed with the wort sub-quantity 07*a*. As supplements, other fluids 07*b*, such as water and/or beer, can also be added. The mixing therein takes place under pressure and under the influence of temperature, for example of 130° C., so as to achieve the best possible dispersion of the hop extract in the wort 07*a* and, at the same time, to ensure the isomerization of the alpha acids comprised in the hop extract.

By driving the shear stirrer, the hop extract droplets dispersed only roughly in the mixing fluid 11 are reduced in size to the extent that a macroemulsion is created in which at least 75% of the hop extract droplets have a particle size of less than or equal to 20 µm. After having passed the first particle size reduction stage 12, the thus obtained macroemulsion 13 is then pumped into a second particle size reduction stage 14, which comprises a high pressure pump 15 and a high pressure relaxation valve 16. By means of the high pressure pump 15, the macroemulsion 13 is pressurized, for example to 250 bar, and is fed through the high pressure relaxation valve 16. Due to the pressure relaxation of the highly pressurized macroemulsion 13, the hop extract droplets comprised therein are further reduced in size and a microemulsion 17 is created. The microemulsion 17 in this case is characterized in particular in that at least 75% of the hop extract droplets have a particle size of less than or equal to 5 µm. The microemulsion 17 can then be temporarily stored in a storage tank 18. Through feed ducts 19, the microemulsion 17 can then later be fed in a delayed manner back into the main volume flow of the wort 07, the microemulsion 17 thereby being optionally fed into the primary feed tank 03, into the wort kettle 04 or into the whirlpool 05 or into the pipe ducts between these tanks or can be introduced upstream or downstream of a device for post-vaporization (stripping) 20 or upstream or downstream of a wort cooler 21. In this regard, it is also conceivable that only sub-quantities of the total necessary amount of hop extract are taken through the microemulsion feed ducts to the different sections of the wort main flow, respectively. For this purpose, the individual sections of the feed ducts 19 can be selectively locked by means of various locking valves (not illustrated).

Multiple parallel system components 08*a* . . . *n*, 09*a* . . . *n*, 12*a* . . . *n*, 14*a* . . . *n* and/or 18*a* . . . *n* are conceivable, too, for simultaneously or consecutively treating and temporarily storing different extracts (bitter extract and aroma extract). The microemulsions 17*a* . . . *n* produced in this way are then used at different points in the process in different amounts in order to produce the corresponding specific hop flavors for the different types of beer. It is conceivable, for example, to install several stocks 09*a* . . . *n* and a corresponding number of storage tanks 18*a* . . . *n*. The two particle size reduction stages 12 and 14, for example, are only provided once or twice. Now, from each type of hop extract in stock 09*a* . . . *n* a microemulsion 17*a* . . . *n* is produced, temporarily stored in the storage tank 18*a* . . . *n* and introduced from there into the manufacture process. The duct 19 in this case can also be provided once or more than once (19*a* . . . *n*).

Figure 2:
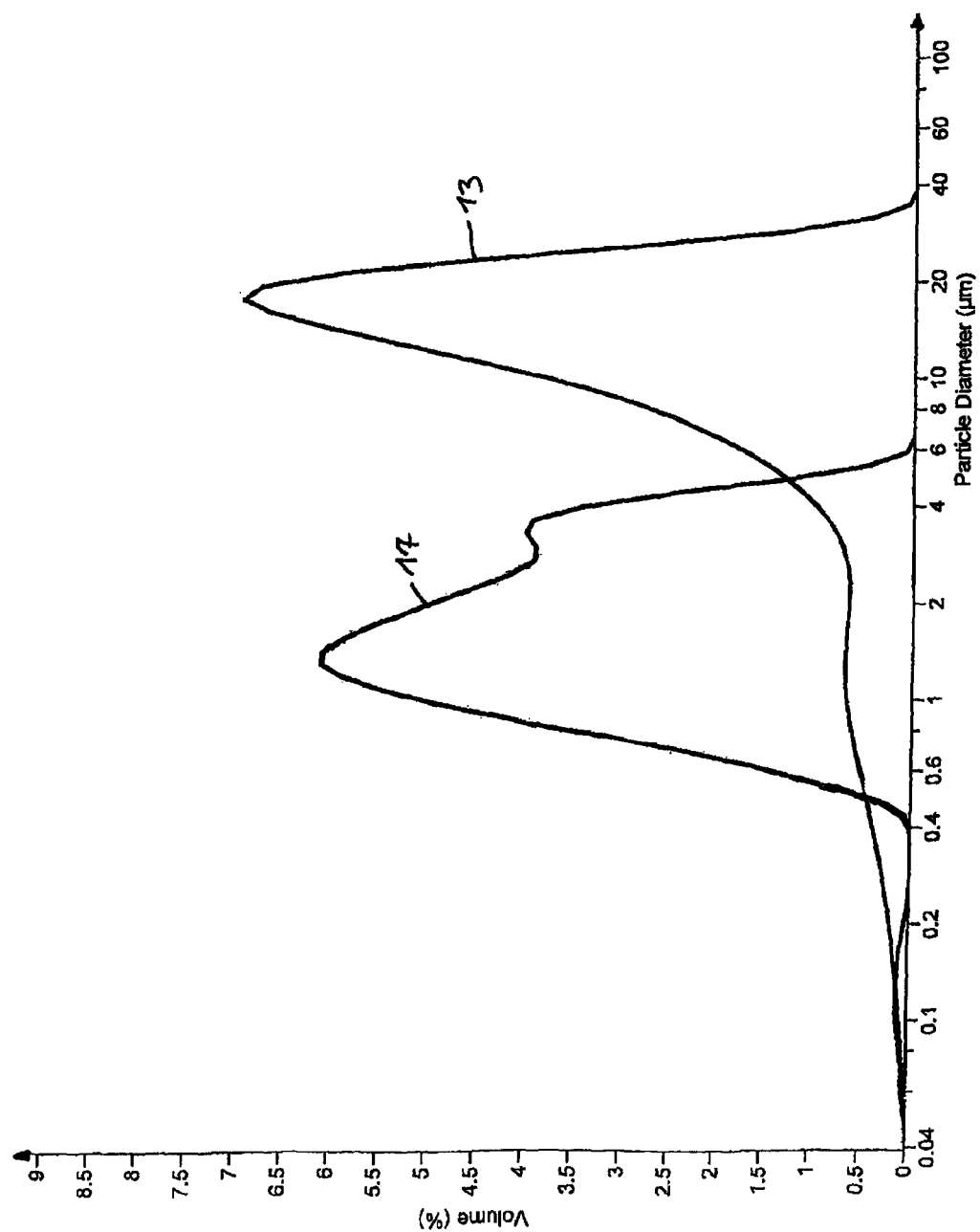
FIG. 2 shows the particle size distribution of the hop extract droplets in a microemulsion in comparison to a macroemulsion.

FIG. 2 shows in a diagram the distribution of the particle sizes of the hop extract droplets in a macroemulsion 13 in comparison to a microemulsion 17. It can be seen that the maximum of the particle size distribution is shifted by the second particle size reduction stage 14 from a particle diameter of about 20 µm towards 1 µm. Due to this reduction of the particle size, the reaction surface on which the ingredients comprised in the hop extract can pass into the aqueous solution is significantly enlarged, and thus the utilization of the hop extract is significantly improved.

FIG. 3 shows the measured data from tests regarding the particle size distribution in a macroemulsion 13. They state that in the illustrated variation at least 75% of the hop extract droplets in the macroemulsion have a particle size of less than 18.14 µm. At least 90% of the hop extract droplets have a particle size of less than 22.48 g. At least 50% of the hop extract droplets have a particle size of less than 12.42 µm. At least 25% of the hop extract droplets have a particle size of less than 5.864 µm. At least 10% of the hop extract droplets have a particle size of less than 1.155 µm. The hop extract droplets in the macroemulsion 13 in the arithmetic mean have a particle size of 12.25 µm.

FIG. 4 shows the measured data for the particle size distribution in a microemulsion 17. In the illustrated variation, the microemulsion was produced by pressure relaxation of the macroemulsion 13 pressurized to 250 bar. As can be taken from FIG. 4, by means of this pressure relaxation, a reduction in particle sizes of the hop extract droplet is realized. In fact, at least 75% of the hop extract droplets in the microemulsion 17 have a particle size of less than 2.592 µm. At least 90% of the hop extract droplets have a particle size of less than 3.682 µm. At least 50% of the hop extract droplets have a particle size of less than 1.623 µm. At least 25% of the hop extract droplets have a particle size of less than 1.098 µm. At least 10% of the hop extract droplets have a particle size of less than 0.809 µm. The hop extract droplets in the microemulsion 17 in the arithmetic mean have a particle size of 1.949 µm.

Figure 5:
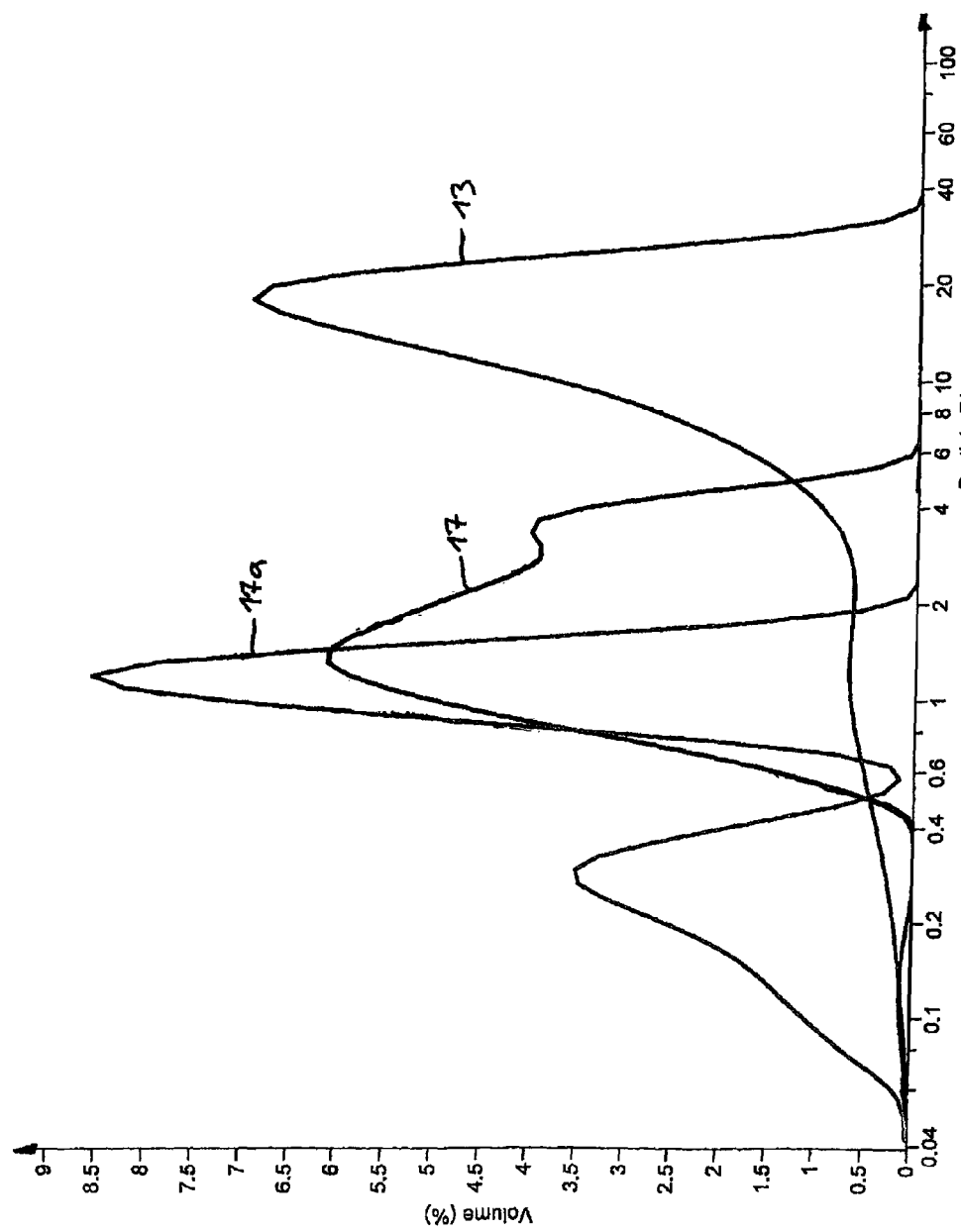
FIG. 5 shows the particle size distribution in a microemulsion which was pressurized twice and fed through a homogenization valve in comparison to the particle size distribution graphs according to FIG. 2.

FIG. 5 again shows the particle size distribution of the macroemulsion 13 and of the microemulsion 17. Also in FIG. 5, the particle size distribution in a microemulsion 17*a* is illustrated. The microemulsion 17*a* is obtained by the microemulsion 17 being pressurized once more to 500 bar and being fed through the high pressure relaxation valve 16. It is apparent that this double pressure relaxed microemulsion 17*a* presents a further reduction of the particle size distribution, wherein the particle size distribution has two relative maxima.

The invention claimed is:

1. A method for adding hops in beer manufacture, said method comprising:
   separating a sub-quantity of aqueous fluid from a quantity of at least one of water, wort or beer;
   adding hop extract in liquid or pasty form to the sub-quantity of aqueous fluid forming a mixture of aqueous fluid and hop extract;
   producing a macroemulsion of the hop extract by emulsifying the hop extract in the sub-quantity of aqueous fluid, wherein at least 75% of hop extract droplets in the macroemulsion have a particle size of less than 20 µm;
   increasing the pressure in the macroemulsion of the hop extract to a feed pressure higher than 100 bar;
   producing a microemulsion of the hop extract by feeding the pressurized macroemulsion through a gap or a valve or by feeding the pressurized macroemulsion against a baffle plate, wherein at least 75% of hop extract droplets in the microemulsion have a particle size of less than 5 µm; and
   inserting at least a portion of the microemulsion of the hop extract into the beer manufacturing process.

2. The method according to claim 1, in which hop extract droplets in the macroemulsion in the arithmetic mean have a particle size in the range of 6 µm to 24 µm.

3. The method according to claim 1, in which hop extract droplets in the microemulsion in the arithmetic mean have a particle size in the range of 0.5 μm to 5 μm.

4. The method according to claim 1, in which the mixture of aqueous fluid and at least one of the hop extract, the macroemulsion, or the microemulsion is subjected to an isomerization temperature treatment, wherein during said isomerization temperature treatment a conversion of alpha acids of the hop extract into iso-alpha acids takes place.

5. The method according to claim 1, in which prior to the addition of the hop extract, the sub-quantity of aqueous fluid is heated under pressure to a temperature above 100° C.

6. The method according to claim 4, in which the isomerization temperature treatment takes place by heating the macroemulsion.

7. The method according to claim 1, in which the feed pressure for the production of the microemulsion of the hop extract is at a maximum pressure level equal to or higher than 200 bar.

8. The method according to claim 1, in which at least 75% of the hop extract droplets in the microemulsion have a particle size of less than 3 μm.

9. The method according to claim 5, in which prior to the addition of the hop extract, the sub-quantity of aqueous fluid is heated under pressure to a temperature between 120° C. and 140° C.

10. The method according to claim 7, in which the feed pressure for the production of the microemulsion of the hop extract is at a maximum pressure level equal to or higher than 400 bar.

* * * * *